(12) United States Patent
DeLuca (10) Patent No.: US 9,021,033 B2
(45) Date of Patent: Apr. 28, 2015

(54) METHOD TO CHANGE INSTANT MESSAGING STATUS BASED ON TEXT ENTERED DURING CONVERSATION

(75) Inventor: Lisa Seacat DeLuca, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 13/483,420

(22) Filed: May 30, 2012

(65) Prior Publication Data

US 2012/0239767 A1    Sep. 20, 2012

Related U.S. Application Data

(63) Continuation-in-part of application No. 12/842,295, filed on Jul. 23, 2010, now Pat. No. 8,219,628.

(51) Int. Cl.
| | |
|---|---|
| H04L 12/58 | (2006.01) |
| H04W 12/06 | (2009.01) |
| H04L 29/08 | (2006.01) |
| H04L 12/18 | (2006.01) |
| H04L 12/24 | (2006.01) |
| H04N 21/4788 | (2011.01) |

(52) U.S. Cl.
CPC ............ H04L 51/043 (2013.01); *H04W 12/06* (2013.01); *H04L 67/24* (2013.01); *H04L 12/1813* (2013.01); *H04L 41/026* (2013.01); *H04N 21/4788* (2013.01); H04L 51/02 (2013.01)

(58) Field of Classification Search
CPC . G06F 15/16; H04L 12/5815; H04L 12/1813; H04L 41/026; H04L 67/24; H04L 51/043; H04M 7/0045; H04N 21/4788; H04W 12/06

USPC .......................................... 709/206, 207, 204
See application file for complete search history.

(56) References Cited

U.S. PATENT DOCUMENTS 7,353,455 B2 *  4/2008  Malik ........................... 715/758
7,478,094 B2    1/2009  Ho et al.
(Continued)

FOREIGN PATENT DOCUMENTS

| EP | 2073517 A1 | 6/2009 |
|---|---|---|
| WO | WO 2010001182 A2 | 1/2010 |

OTHER PUBLICATIONS

Saint-Andre, "Extensible Messaging and Presence Protocol (XMPP): Core", RFC 6120, 2011.*

(Continued)

*Primary Examiner* — Ondrej C. Vostal
(74) *Attorney, Agent, or Firm* — Cahn & Samuels, LLP (57) ABSTRACT

An embodiment of the invention provides a method for communication within a system, wherein an instant messaging conversation is initiated between a first user and a second user. An indicator and a text entry are received from the first user during the instant messaging conversation. The status of the first user is changed, including automatically setting the text entry as the status of the first user, and automatically including the name of the second user in the status of the first user if preferences of the first user indicate that the name of the second user is to be included in the status of the first user. Further, the text entry is automatically sent to the second user if the preferences of the first user indicate that a text entry following the indicator is to be automatically sent to the second user.

19 Claims, 7 Drawing Sheets

(56) References Cited

U.S. PATENT DOCUMENTS

| | | | | |
|---|---|---|---|---|
| 7,702,693 | B1 | 4/2010 | Aiyagari et al. | |
| 7,949,712 | B2* | 5/2011 | Friedman | 709/206 |
| 8,180,840 | B2* | 5/2012 | Malik | 709/207 |
| 8,365,018 | B2* | 1/2013 | McIntosh et al. | 714/23 |
| 8,473,545 | B2* | 6/2013 | McLaughlin | 709/203 |
| 2003/0193478 | A1* | 10/2003 | Ng et al. | 345/168 |
| 2004/0078444 | A1* | 4/2004 | Malik | 709/206 |
| 2004/0158608 | A1* | 8/2004 | Friedman | 709/206 |
| 2005/0021652 | A1* | 1/2005 | McCormack | 709/207 |
| 2005/0198589 | A1* | 9/2005 | Heikes et al. | 715/805 |
| 2006/0009243 | A1* | 1/2006 | Dahan et al. | 455/466 |
| 2006/0119582 | A1* | 6/2006 | Ng et al. | 345/168 |
| 2007/0005365 | A1* | 1/2007 | Goodman et al. | 704/270 |
| 2007/0060174 | A1* | 3/2007 | Newton et al. | 455/456.5 |
| 2007/0067334 | A1 | 3/2007 | Durbin | |
| 2007/0143415 | A1* | 6/2007 | Daigle | 709/206 |
| 2007/0168444 | A1* | 7/2007 | Chen et al. | 709/207 |
| 2007/0192227 | A1* | 8/2007 | Fitzpatrick et al. | 705/36 R |
| 2008/0005119 | A1* | 1/2008 | Fernandez et al. | 707/10 |
| 2008/0028031 | A1* | 1/2008 | Bailey et al. | 709/207 |
| 2008/0088487 | A1* | 4/2008 | Li | 341/22 |
| 2008/0091782 | A1* | 4/2008 | Jakobson | 709/206 |
| 2008/0167015 | A1 | 7/2008 | Vishwanathan et al. | |
| 2008/0207329 | A1* | 8/2008 | Wallace et al. | 463/42 |
| 2008/0240379 | A1 | 10/2008 | Maislos et al. | |
| 2008/0261569 | A1* | 10/2008 | Britt et al. | 455/414.1 |
| 2009/0024710 | A1 | 1/2009 | Danker et al. | |
| 2009/0029674 | A1 | 1/2009 | Brezina et al. | |
| 2009/0086720 | A1 | 4/2009 | Westlake | |
| 2009/0113342 | A1 | 4/2009 | Bank et al. | |
| 2009/0136013 | A1 | 5/2009 | Kuykendall et al. | |
| 2009/0147772 | A1* | 6/2009 | Rao et al. | 370/352 |
| 2009/0176521 | A1* | 7/2009 | Klassen et al. | 455/466 |
| 2009/0285372 | A1 | 11/2009 | Barton et al. | |
| 2009/0288168 | A1* | 11/2009 | Maghsoodnia et al. | 726/24 |
| 2009/0292769 | A1* | 11/2009 | Matsuzawa | 709/204 |
| 2010/0057875 | A1* | 3/2010 | Bychkov et al. | 709/206 |
| 2010/0064353 | A1* | 3/2010 | Kan et al. | 726/5 |
| 2010/0150333 | A1* | 6/2010 | Goodman et al. | 379/207.02 |
| 2010/0262660 | A1* | 10/2010 | Little et al. | 709/206 |
| 2011/0066941 | A1* | 3/2011 | Chipchase et al. | 715/716 |
| 2011/0075820 | A1* | 3/2011 | Mikan et al. | 379/88.13 |
| 2011/0113320 | A1* | 5/2011 | Neff et al. | 715/230 |

OTHER PUBLICATIONS

Lonnfors et al., "Session Initiation Protocol (SIP) Extension for Partial Notification of Presence Information", RFC 5263, 2008.*
Saint-Andre, "Extensible Messaging and Presence Protocol (XMPP): Instant Messaging Presence", RFC 3921, 2004.*
Saint-Andre, "Extensible Messaging and Presence Protocol (XMPP): Core", RFC 3920, 2004.*
Peterson, "Common Profile for Instant Messaging (CPIM)", RFC 3860, 2004.*
Day et al., "A Model for Presence and Instant Messaging", RFC 2778, 2000.*
De Guzman et al., "Exploring and Design and Use of Peripheral Displays of Awareness Information", 2004.*
Law et al., "Smart Instant Messenger in Pervasive Computing Environments", 2006.*
Greene et al., "Instant Messaging & Presence Management in Mobile Ad-Hoc Networks", 2004.*
Saint-Andre et al., "XEP-0127: Common Alerting Protocol (CAP) Over XMPP", 2004.*
Saint-Andre, "XEP-0045: Multi-User Chat", 2012.*
Saint-Andre, "Extensible Messaging and Presence Protocol (XMPP): Address Format", RFC 6122, 2011.*
Saint-Andre, "Extensible Messaging and Presence Protocol (XMPP): Instant Messaging and Presence", RFC 6121, 2011.*
Merriam Webster, "Status", 2014.*
Merriam Webster, "indicator", 2014.*
Merriam Webster, "preference", 2014.*
Eagle, N., et al., "Social Serendipity: Mobilizing Social Software," Pervasive Computing, IEEE, 2005.
Ilarri, S, et al., "Location-Dependent Query Processing: Where We Are and Where We Are Heading", ACM Computing Surveys, vol. 42, No. 3, Article 12, Mar. 2010.
Change User Status,Parrot-IM Help, http://sites.google.com/site/parrotimhelp/index/how-to-log-in/how-to-chat/how-to-exit-sign-out/how-to-save-conversation/change-user-status.
Massaguer, D., et al., "Middleware for Pervasive Spaces: Balancing Privacy and Utility," 2009.
Melinger, D., "Privacy's Role in Mobile Social Software for the Urban Community," 1999-2000.
Puttaswamy, K., et al., "Preserving Privacy in Location-based Mobile Social Applications," HotMobile 2010, Feb. 22-23, 2010.
Shehab, et al., "Beyond User-to-User Access Control for Online Social Networks," ICICS 2008, LNCS 5308, pp. 174-189, 2008.
Trust and Safety, Twitter Blog, http://blog.twitter.com/2010/03/trust-and-safety.html.
Help Us Nail Spammers, Twitter Blog, http://blog.twitter.com/2009/10/help-us-nail-spammers.html.

\* cited by examiner

METHOD TO CHANGE INSTANT MESSAGING STATUS BASED ON TEXT ENTERED DURING CONVERSATION

The present application is a Continuation-In-Part patent application of U.S. Ser. No. 12/842,295 filed Jul. 23, 2010, the entirety of which is incorporated herein by reference.

BACKGROUND

The present invention is in the field of methods, systems, and computer program products for changing instant messaging status based on text entered during conversation.

The World Wide Web provides access to numerous social and business networking applications (e.g., FACEBOOK.COM, LINKEDIN.COM). Modern technological advances have made the Internet more accessible at faster connection speeds. As a result, such web applications have become an increasingly popular means for people to communicate with their friends, family, and colleagues.

For example, members of social networking sites are able to stay in touch with their friends and family by sharing and receiving photographs, videos, electronic messages, and status updates. Status updates are also useful in business applications, where a user can set his or her status to, for example, "busy", "on the phone", or "in a meeting". Many web applications also have instant messaging (IM) tools that allow users to quickly and efficiently communicate with each other without incurring telephone or text messaging charges.

SUMMARY OF THE INVENTION

An embodiment of the invention includes methods, systems, and computer program products for communication within a system. An instant messaging conversation is initiated between a first user and a second user. An indicator and a text entry are received from the first user during the instant messaging conversation, wherein the indicator prompts a change in status of the first user. The status of the first user is changed, including automatically setting the text entry as the status of the first user, and automatically including the name of the second user in the status of the first user if preferences of the first user indicate that the name of the second user is to be included in the status of the first user. Further, the text entry is automatically sent to the second user if the preferences of the first user indicate that a text entry following the indicator is to be automatically sent to the second user.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

Figure 1:
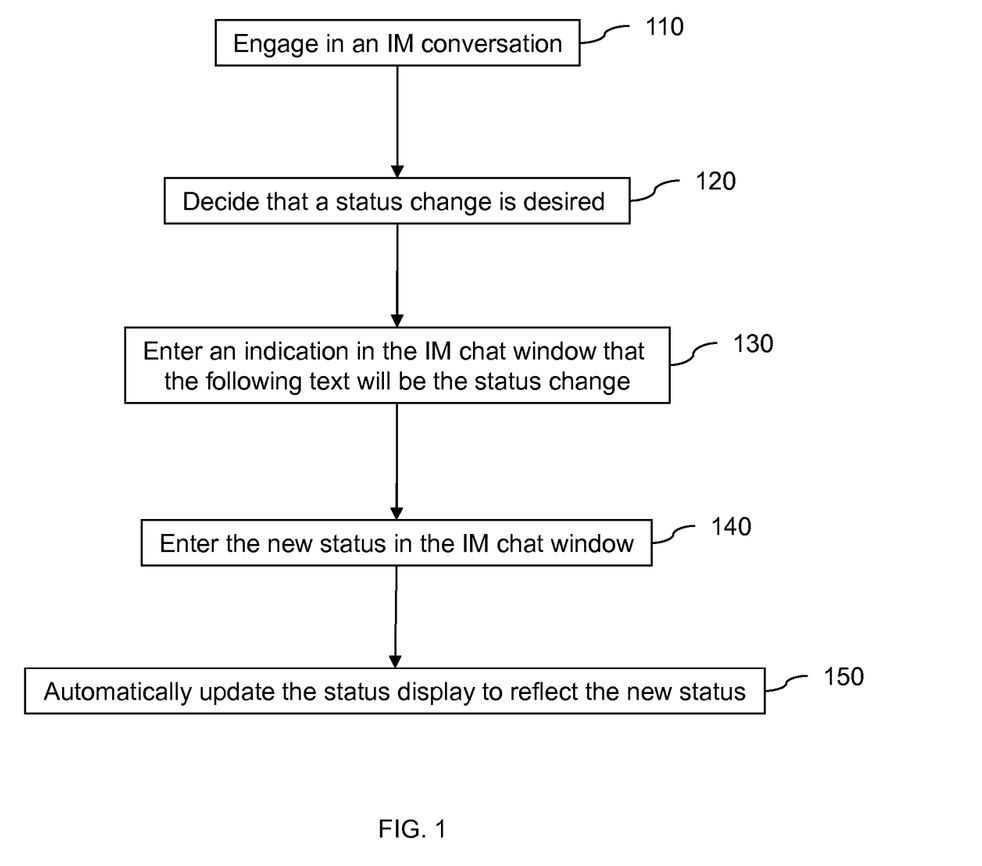
FIG. 1 is a flow diagram illustrating a method for changing status within a web application directly within a chat window based on an indicator according to an embodiment of the invention.

An embodiment of the invention allows a user to type out an emotion or status in the current chat window, wherein the entered text is automatically propagated to the user's status display for a one-time input status change. FIG. 1 is a flow diagram illustrating a method for changing status within a web application (e.g., social networking web site, instant messaging client) directly within a chat window based on an indicator, according to an embodiment of the invention. The user engages in an instant messaging conversation using an instant messaging tool of the web application (110). The instant messaging conversation can be initiated by the user or by the other party to the instant messaging conversation.

The user decides that she would like to change her status (120) and enters an indication that the following text will be the changed status (130). In at least one embodiment of the invention, the indicator is a sequence of keystrokes, for example, "←", ">>", "=", "F1" key, "SHIFT key—UP ARROW key" (pressed simultaneously), or any sequence of keystrokes that is pre-defined by the user and/or administrator of the web application. In another embodiment, the indicator is a change in font size (e.g., 12-point font), color (RED text), and/or font-family (e.g., Times New Roman, Arial, and/or Courier New). In yet another embodiment, the indicator is a keyword that is pre-defined by the user and/or administrator of the web application, e.g., "STATUS".

The user follows the indicator with the new status (140); and, the user's status display is updated to reflect the new message (150). The following string of text entries provides an example instant messaging conversation:

Lisa: Hey how are you?
Bob: Great, just getting ready to go to Tahiti
Lisa: ←jealous In at least one embodiment of the invention, the web application recognizes that Lisa (i.e., the user) has input an indicator that specifies that the current status should be changed. To share this emotion with other people besides Bob, she typed the indicator "←". Immediately after pressing enter, her status changed to "Lisa is jealous".

In at least one embodiment of the invention, the user specifies whether she would like the name of the individual that she is chatting with to be included in the status change. As used herein, the term "name" refers to an individual's legal name (any combination of first name, middle name, middle initial, and surname), e-mail address, screen name, handle, and/or user ID. Therefore, in the example above, if Lisa prefers that Bob's first name is to be included in the status change, the web application would recognize that Lisa is engaged in an instant messaging conversation with Bob, and her status would be automatically changed to "Lisa is jealous of Bob". If Lisa prefers that Bob's handle be included in the status change, her status would be automatically changed to "Lisa is jealous of @bob123". In at least one embodiment, the user defines her preferences when registering for the web application, or at any time during use of the web application. In another embodiment, the web application has a default setting/preference (e.g., do not include name of other party in the status change) that can be subsequently altered by the user.

In at least one embodiment of the invention, user preferences include whether the other user (i.e., the other person that the user is engaged in the instant messaging conversation with) should receive the message or not. In the example above, Bob could either receive the message (i.e., "jealous") and the status is changed, or just the status is changed. Similarly, in one embodiment, this user preference is defined when the user registers for the web application, or at any time during use of the web application. In another embodiment, the web application has a default setting/preference (e.g., send message to the other party to the instant messaging conversation) that can be subsequently altered by the user.

In another embodiment of the invention, the indicator is a predefined icon, such as, for example, the "☺" or "☹" icon, that is propagated to the user's status. Thus, the user does not have to follow the indicator with text in order to change the status display. For example, if the user enters the "☺" icon into the chat window, the status is changed to "☺" or "Happy", depending upon user preferences or default web application settings. In at least one embodiment, the user preferences and default web application settings also define the various icons that are used as indicators. In another embodiment, the user preferences and default web application settings define when the icons are to be used as indicators, for instance, only when an icon is at the beginning of the chat message, when the icon is located anywhere in the chat message, or when the icon is the only entry in the body of the chat message (e.g., after receiving a chat message from another party, the user types ":"-"("- and presses the "ENTER" key).

Figure 2:
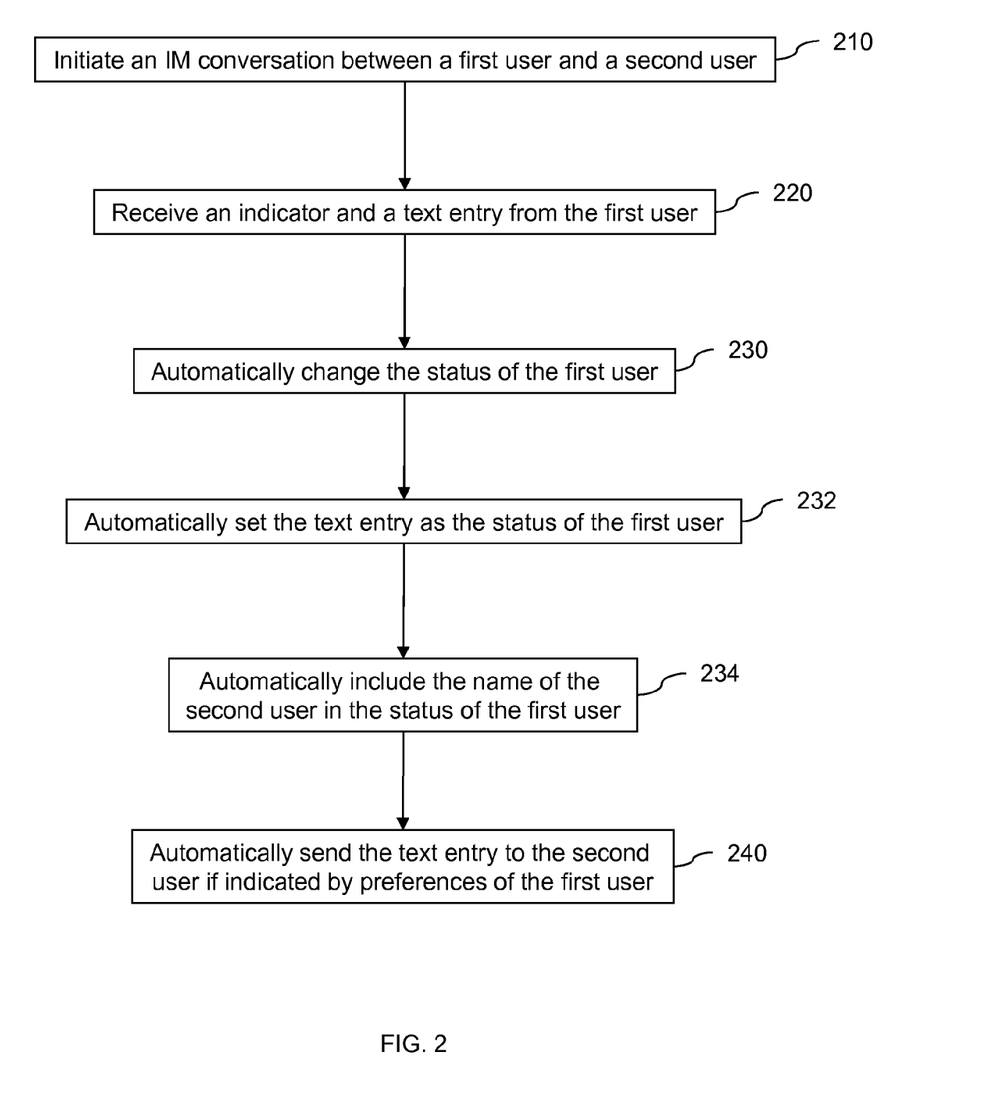
FIG. 2 is a flow diagram illustrating a method for changing instant messaging status according to an embodiment of the invention.
Figure 3:
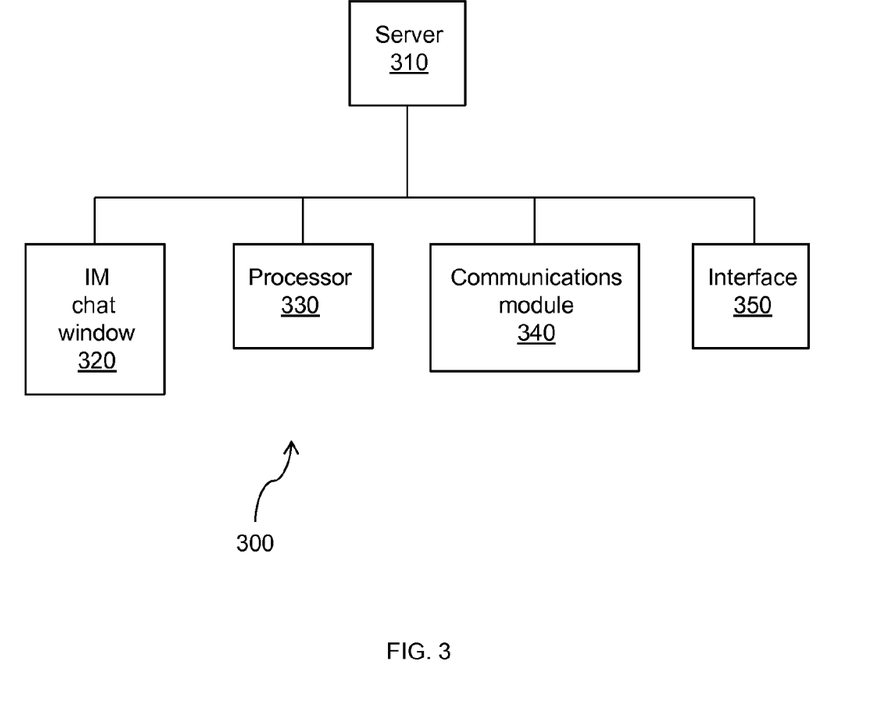
FIG. 3 illustrates a system for changing instant messaging status according to an embodiment of the invention.

FIG. 2 is a flow diagram illustrating a method for changing instant messaging status in a system (e.g., social networking web site, electronic mail system, mobile telephone network, local area network, instant messaging client) according to an embodiment of the invention. As illustrated in FIG. 3, a system 300 includes a server 310 for hosting the instant messaging conversation. An instant messaging conversation is initiated between a first user and a second user in the web application 210. The instant messaging conversation is initiated by the system 300 based on a prompt by the first user or the second user.

An indicator and a text entry are received from the first user during the instant messaging conversation 220. In at least one embodiment of the invention, the indicator and text entry are received in the same instant message (i.e., before the first user presses ENTER). In an alternative embodiment, the indicator and text entry are received in different messages (i.e., the first user inputs the indicator, presses ENTER, and inputs the text entry). The text entry is directly received from the first user only in an instant messaging chat window 320 (not in the status update text box of the web application).

The indicator prompts a change in status of the first user. In at least one embodiment of the invention, the indicator includes a pre-defined sequence of keystrokes, a pre-defined icon, a keyword, and/or a change in at least one of font (e.g., Times New Roman, Arial, Courier New), font style (e.g., bold, underline, italicize), font size, and font color in the text entry relative to an immediately preceding text entry. In at least one embodiment, the indicator is pre-defined by the first user in a registration process.

The status of the first user is automatically changed 230 with a processor 330. The status change includes automatically setting the text entry as the status of the first user 232. Thus, the status of the first user is changed without the first user having to manually enter text into a standard status update text box of the system. This facilitates one-time input by the first user to change his or her status.

In addition, the status change includes automatically including the name of the second user (e.g., first name, last name, first and last names, handle, user ID) in the status of the first user if preferences of the first user indicate that the name of the second user is to be included in the status of the first user 234. For instance, in the example described above where Lisa is the first user, Lisa's status is changed to "Lisa is jealous of Bob" without the Lisa having to manually type Bob's name. The name of the second user is not automatically included in the status change if the preferences of the first user indicate that the name of the second user is not to be included in the status of the first user. Thus, in the example above, Lisa's status would only be changed to "Lisa is jealous".

The text entry is automatically sent to the second user via a communications module 340 if the preferences of the first user indicate that a text entry following the indicator is to be automatically sent to the second user 240. The text entry, however, is not automatically sent to the second user if the preferences of the first user indicate that a text entry following the indicator is not to be automatically sent to the second user.

The preferences of the first user are defined in a registration process using a user interface 350. The preferences include whether the name of the second user is to be automatically included in the status of the first user and/or whether the text entry following the indicator is to be automatically sent to the second user. In at least one embodiment, default settings for the preferences include a preference for automatically including the name of the second user in the status of the first user and/or a preference for automatically sending the text entry following the indicator to the second user.

In at least one embodiment of the invention, the indicator is associated with a pre-defined status (e.g., happy, busy, on the phone); and, the status of the first user is automatically changed to include the pre-defined status. For example, during the registration process, the first user creates a "on the phone" indicator and associates the indicator with a "busy" status. Thus, when the "on the phone" indicator is input into the chat window, the first user's status is automatically changed to "busy".

In at least one embodiment, the text entry entered by the first user is automatically set as the status of the second user. The name of the first user is automatically included in the status of the second user if preferences of the second user indicate that the name of the first user is to be included in the status of the second user. Thus, in the example above, Bob's status is automatically changed to "Lisa is jealous of me" or "Lisa is jealous of Bob", depending on Bob's preferences. The status of the second user is automatically changed if the second user's preferences indicate that his status will be updated if his name is included in the status of another user. Such preferences specify that the second user's status will be automatically changed if his name is manually entered into the other user's status by the other user and/or if his name is automatically included in the other user's status (i.e., by the system). Moreover, the preferences of the second user specify that his status will be automatically changed if his name is included in the status of any users in his network or only specific users defined by the second user.

In another embodiment, the user's systems (e.g., social networking web site, electronic mail system, local area network) are linked such that a status change in one of the systems automatically changes the status in one or more of the user's other systems, as specified by the user. For example, if John's status is changed to "John is in a meeting" in John's work LAN, John's status is also automatically changed to "John is in a meeting" in John's social networking web site.

Figure 4:
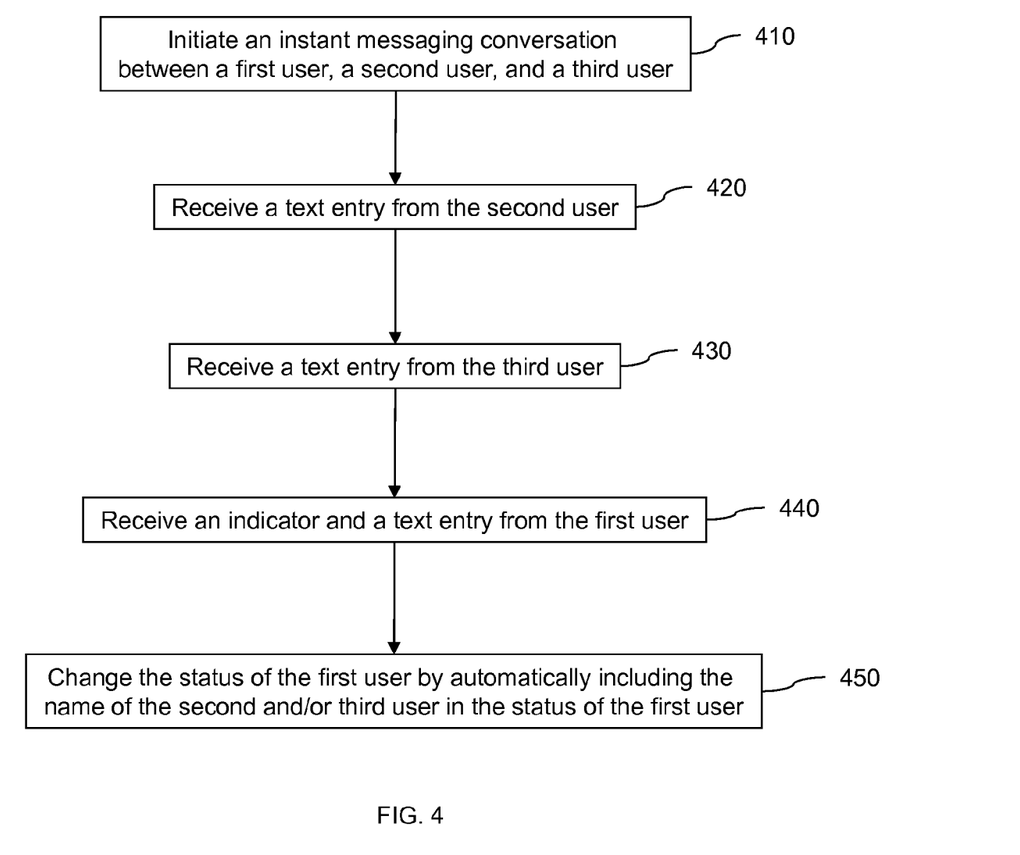
FIG. 4 is a flow diagram illustrating a method for communication within a system according to an embodiment of the invention.

FIG. 4 is a flow diagram illustrating a method for communication within a system according to an embodiment of the invention. An instant messaging conversation is initiated between a first user, a second user, and a third user 410. A text entry is received from the second user 420; and, a text entry is received from the third user 430, wherein the text entry from the second user and/or the text entry from the third user includes a keyword. An indicator and a text entry are received from the first user 440, wherein the text entry from the first user includes the keyword and the indicator prompts a change in status of the first user. In at least one embodiment, the text entry is directly received from the first user only in an instant messaging chat window. The following string of text entries provides an example instant messaging conversation, wherein John is the first user, Bob is the second user, Susan is the third user, and "←" is the indicator:

Bob: I'm going to Hawaii
Susan: I want to have Pizza for lunch
John: ←jealous Hawaii The status of the first user is changed with a processor 450, wherein the keyword is automatically included in the status of the first user. In addition, the status of the first user is changed by automatically including the name of the second user in the status of the first user when the text entry from the second user includes the keyword, and automatically including the name of the third user in the status of the first user when the text entry from the third user includes the keyword. Thus, in the example in the preceding paragraph, the keyword is "Hawaii" and John's status is changed to "Jealous of Bob going to Hawaii". In another embodiment, Bob's status is changed to "John is jealous I'm going to Hawaii".

Because the keyword is in both Bob's message and John's message, it is determined that John is jealous of Bob, and not Susan. If John had entered "jealous pizza", then the processor would have determined that John is jealous of Susan. If both Bob and Susan had entered "Hawaii", then John's status would be changed to include both Bob's and Susan's names. In another embodiment of the invention, John would be prompted to select who the new status should be directed towards.

In at least one embodiment, the changing of the status of the first user includes automatically changing the status of the first user in the system, and automatically changing the status of the first user in at least one other system of the first user. In another embodiment of the invention, the method further includes automatically sending the status of the first user to the second user if the preferences of the first user indicates that a text entry following the indicator is to be automatically sent to the second user, and automatically sending the status of the first user to the third user if the preferences of the first user indicate that a text entry following the indicator is to be automatically sent to the third user. In yet another embodiment, the indicator is associated with a pre-defined status, and wherein the automatically changing of the status includes changing the status of the first user to include the pre-defined status.

Figure 5:
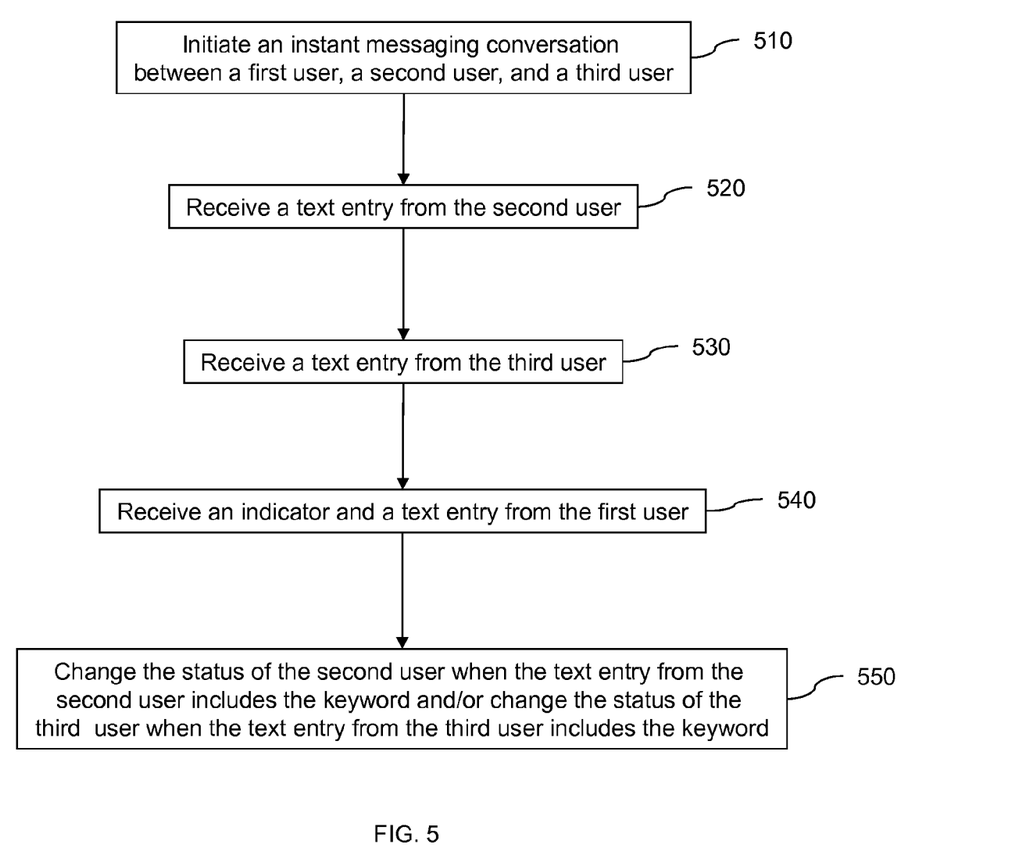
FIG. 5 is a flow diagram illustrating a method for communication within a system according to another embodiment of the invention.

FIG. 5 is a flow diagram illustrating a method for communication within a system according to an embodiment of the invention. An instant messaging conversation is initiated between a first user, a second user, and a third user 510. A text entry is received from the second user 520; and, a text entry is received from the third user 530, wherein the text entry from the second user and/or the text entry from the third user includes a keyword. An indicator and a text entry are received from the first user 540. The indicator prompts a change in status of the first user; and, the text entry from the first user includes the keyword.

A processor changes the status of the second user when the text entry from the second user includes the keyword and/or changes the status of the third user when the text entry from the third user includes the keyword 550. The changing of the status of the second user includes automatically including the keyword and a name of the first user in the status of the second user; and, the changing of the status of the third user includes automatically including the keyword and the name of the first user in the status of the third user.

In at least one embodiment of the invention, the changing of the status of the second user includes automatically changing the status of the second user in the system and automatically changing the status of the second user in at least one other system of the second user. Furthermore, the changing of the status of the third user includes automatically changing the status of the third user in the system and automatically changing the status of the third user in at least one other system of the third user. In another embodiment, the indicator is associated with a pre-defined status, wherein the method further includes changing the status of the first user to include the pre-defined status.

Figure 6:
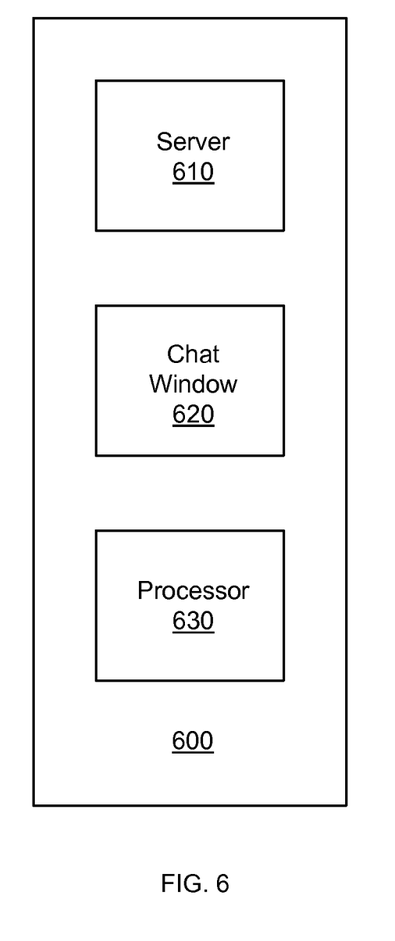
FIG. 6 illustrates a system for communication according to an embodiment of the invention.

FIG. 6 illustrates a system 600 for communication according to an embodiment of the invention. The system 600 includes a server 610 for hosting an instant messaging conversation between a first user, a second user, and a third user. A chat window 620 is connected to the server 610. As used herein, the term "connected" includes operationally connected, logically connected, in communication with, physically connected, engaged, coupled, contacts, linked, affixed, and attached. The chat window 620 receives a text entry from the second user, a text entry from the third user where the text entry from the second user and/or the text entry from the third user includes a keyword, and an indicator and a text entry from the first user. The indicator prompts a change in status of the first user; and, the text entry from the first user includes the keyword.

A processor 630 is connected to the chat window 620, wherein the processor 630 changes the status of the first user by automatically including the keyword in the status of the first user. The status of the first user is further changed by automatically including a name of the second user in the status of the first user when the text entry from the second user includes the keyword, and automatically including a name of the third user in the status of the first user when the text entry from the third user includes the keyword.

In at least one embodiment, the processor 630 automatically changes the status of the first user in the system and automatically changing the status of the first user in at least one other system of the first user. In another embodiment, the indicator is associated with a pre-defined status, wherein the processor 630 changes the status of the first user to include the pre-defined status.

In another embodiment of the invention, the processor 630 changes the status of the second user when the text entry from the second user includes the keyword by automatically including the keyword and the name of the first user in the status of the second user, and/or changes the status of the third user when the text entry from the third user includes the keyword by automatically including the keyword and the name of the first user in the status of the third user. In yet another embodiment, the processor 630 automatically changes the status of the second user in the system and automatically changing the status of the second user in at least one other system of the second user. In still another embodiment, the processor 630 automatically changes the status of the third user in the system and automatically changing the status of the third user in at least one other system of the third user.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
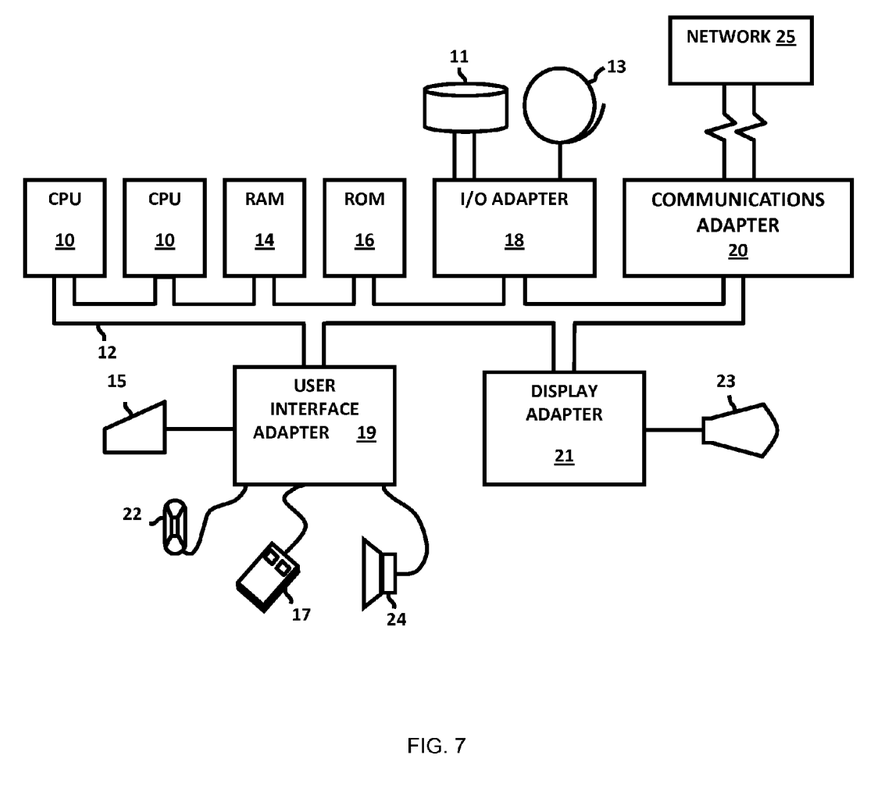
FIG. 7 illustrates a computer program product according to an embodiment of the invention.

Referring now to FIG. 7, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for communication within a system, said method including:
    initiating an instant messaging conversation between at least a first user, a second user, and a third user;
    receiving a text entry from the second user;
    receiving a text entry from the third user, at least one of the text entry from the second user and the text entry from the third user including a keyword;
    receiving an indicator and a text entry from the first user, the indicator prompting a change in status of the first user, the text entry from the first user including the keyword;
    displaying the text entry from the first user, the text entry from the second user, and the text entry from the third user in a chat window;
    automatically changing the status of the first user with a central processing unit in response to said receiving of the indicator, said changing of the status including:
        automatically including the keyword in the status of the first user,
        automatically including a name of the second user in the status of the first user when the text entry from the second user includes the keyword, and
        automatically including a name of the third user in the status of the first user when the text entry from the third user includes the keyword;
    displaying the changed status of the first user in a status display;
    automatically sending the text entry from the first user to the second user if the preferences of the first user indicate that a text entry following the indicator is to be automatically sent to the second user; and
    automatically sending the text entry from of the first user to the third user if the preferences of the first user indicate that a text entry following the indicator is to be automatically sent to the third user.

2. The method according to claim 1, wherein said changing of the status of the first user includes automatically changing the status of the first user in the system and automatically changing the status of the first user in at least one other system of the first user.

3. The method according to claim 1, wherein the indicator is associated with a pre-defined status, and wherein said automatically changing of the status includes changing the status of the first user to include the pre-defined status.

4. The method according to claim 1, wherein the text entry is directly received from the first user only in an instant messaging chat window.

5. A method for communication within a system, said method including:
    initiating an instant messaging conversation between at least a first user, a second user, and a third user;
    receiving a text entry from the second user;
    receiving a text entry from the third user, at least one of the text entry from the second user and the text entry from the third user including a keyword;
    receiving an indicator and a text entry from the first user, the indicator prompting a change in status of the first user, the text entry from the first user including the keyword;
    displaying the text entry from the first user, the text entry from the second user, and the text entry from the third user in a chat window;
    at least one of automatically changing the status of the second user with a central processing unit in response to said receiving of the indicator when the text entry from the second user includes the keyword and automatically changing the status of the third user with the central processing unit in response to said receiving of the indicator when the text entry from the third user includes the keyword,
        said changing of the status of the second user including automatically including the keyword and a name of the first user in the status of the second user, and
        said changing of the status of the third user including automatically including the keyword and the name of the first user in the status of the third user;
    at least one of displaying the changed status of the second user in a status display and displaying the changed status of the third user in the status display, the status display being separate from the chat window;
    automatically sending the text entry from the first user to the second user if the preferences of the first user indicate that a text entry following the indicator is to be automatically sent to the second user; and
    automatically sending the text entry from of the first user to the third user if the preferences of the first user indicate that a text entry following the indicator is to be automatically sent to the third user.

6. The method according to claim 5, wherein said changing of the status of the second user includes automatically changing the status of the second user in the system and automatically changing the status of the second user in at least one other system of the second user.

7. The method according to claim 5, wherein said changing of the status of the third user includes automatically changing the status of the third user in the system and automatically changing the status of the third user in at least one other system of the third user.

8. The method according to claim 5, wherein the indicator is associated with a pre-defined status, and wherein said method further includes changing the status of the first user to include the pre-defined status.

9. The method according to claim 5, wherein the text entry is directly received from the first user only in an instant messaging chat window.

10. A system including:
a server for hosting an instant messaging conversation between at least a first user, a second user, and a third user;
a chat window connected to said server, said chat window receives:
a text entry from the second user,
a text entry from the third user, at least one of the text entry from the second user and the text entry from the third user including a keyword, and
an indicator and a text entry from the first user, the indicator prompting a change in status of the first user, the text entry from the first user including the keyword;
a central processing unit connected to said chat window, said central processing unit automatically changes the status of the first user in response to the receipt of the indicator by:
automatically including the keyword in the status of the first user,
automatically including a name of the second user in the status of the first user when the text entry from the second user includes the keyword, and
automatically including a name of the third user in the status of the first user when the text entry from the third user includes the keyword,
said central processing unit:
automatically sends the text entry from the first user to the second user if the preferences of the first user indicate that a text entry following the indicator is to be automatically sent to the second user, and
automatically sends the text entry from of the first user to the third user if the preferences of the first user indicate that a text entry following the indicator is to be automatically sent to the third user; and
a status display connected to said central processing unit, said status display displays the changed status of the first user.

11. The system according to claim 10, wherein said central processing unit automatically changes the status of the first user in said system and automatically changing the status of the first user in at least one other system of the first user.

12. The system according to claim 10, wherein the indicator is associated with a pre-defined status, and wherein said central processing unit changes the status of the first user to include the pre-defined status.

13. The system according to claim 10, wherein the text entry is directly received from the first user only in said chat window.

14. A system including:
a server for hosting an instant messaging conversation between at least a first user, a second user, and a third user;
a chat window connected to said server, said chat window receives:
a text entry from the second user,
a text entry from the third user, at least one of the text entry from the second user and the text entry from the third user including a keyword, and
an indicator and a text entry from the first user, the indicator prompting a change in status of the first user, the text entry from the first user including the keyword; and
a central processing unit connected to said chat window, said central processing unit at least one of:
changes the status of the second user in response to the receipt of the indicator when the text entry from the second user includes the keyword by automatically including the keyword and a name of the first user in the status of the second user, and
changes the status of the third user in response to the receipt of the indicator when the text entry from the third user includes the keyword by automatically including the keyword and the name of the first user in the status of the third user,
said central processing unit:
automatically sends the text entry from the first user to the second user if the preferences of the first user indicate that a text entry following the indicator is to be automatically sent to the second user, and
automatically sends the text entry from of the first user to the third user if the preferences of the first user indicate that a text entry following the indicator is to be automatically sent to the third user; and
a status display connected to said central processing unit, said status display displays at least one of the changed status of the second user and the changed status of the third user, said status display being separate from said chat window.

15. The system according to claim 14, wherein said central processing unit at least one of:
automatically changes the status of the second user in said system and automatically changing the status of the second user in at least one other system of the second user; and
automatically changes the status of the third user in said system and automatically changing the status of the third user in at least one other system of the third user.

16. The system according to claim 14, wherein the indicator is associated with a pre-defined status, and wherein said central processing unit changes the status of the first user to include the pre-defined status.

17. The system according to claim 14, wherein the text entry is directly received from the first user only in said chat window.

18. A computer program product for communication within a system, said computer program product including:
a non-transitory computer readable storage medium;
first program instructions to initiate an instant messaging conversation between at least a first user, a second user, and a third user;
second program instructions to receive a text entry from the second user;

third program instructions to receive a text entry from the third user, at least one of the text entry from the second user and the text entry from the third user including a keyword;

fourth program instructions to receive an indicator and a text entry from the first user, the indicator prompting a change in status of the first user, the text entry from the first user including the keyword; and fifth program instructions to display the text entry from the first user, the text entry from the second user, and the text entry from the third user in a chat window;

sixth program instructions to automatically change the status of the first user in response to said receiving of the indicator, said changing of the status including:
- automatically including the keyword in the status of the first user,
- automatically including a name of the second user in the status of the first user only when the text entry from the second user includes the keyword, and
- automatically including a name of the third user in the status of the first user only when the text entry from the third user includes the keyword;

seventh program instructions to display the changed status of the first user in a status display;

eighth program instructions to automatically send the text entry from the first user to the second user if the preferences of the first user indicate that a text entry following the indicator is to be automatically sent to the second user; and ninth program instructions to automatically send the text entry from of the first user to the third user if the preferences of the first user indicate that a text entry following the indicator is to be automatically sent to the third user, said first program instructions, said second program instructions, said third program instructions, said fourth program instructions, said fifth program instructions, said sixth program instructions, and said seventh program instructions, said eighth program instructions, and said ninth program instructions are stored on said computer readable storage medium.

19. The computer program product according to claim 18, wherein said sixth program instructions automatically changes the status of the first user in the system and automatically changes the status of the first user in at least one other system of the first user.

* * * * *